Aug. 1, 1967

R. A. ELFAST, JR 3,333,343

DEVICE FOR MEASURING A DIMENSION AND SIMULTANEOUSLY CALCULATING A RESULT

Filed Sept. 13, 1965

INVENTOR.
Royal Albert Elfast, Jr.
BY
Cushman, Darby & Cushman
Attorneys

United States Patent Office 3,333,343
Patented Aug. 1, 1967

3,333,343
DEVICE FOR MEASURING A DIMENSION AND SIMULTANEOUSLY CALCULATING A RESULT
Royal Albert Elfast, Jr., Uppsala, Sweden, assignor to Cal-Cal Establishment, a corporation of Liechtenstein
Filed Sept. 13, 1965, Ser. No. 486,942
5 Claims. (Cl. 33—143)

ABSTRACT OF THE DISCLOSURE

An instrument for measuring a dimension and immediately calculating a result based on the measurement taking into account a known variable. The instrument has three moving parts, two being used for the measurement and the third, which is graduated in values of the known variable, being used in slide rule fashion to indicate the result sought on one of the other parts.

---

Figure 1:
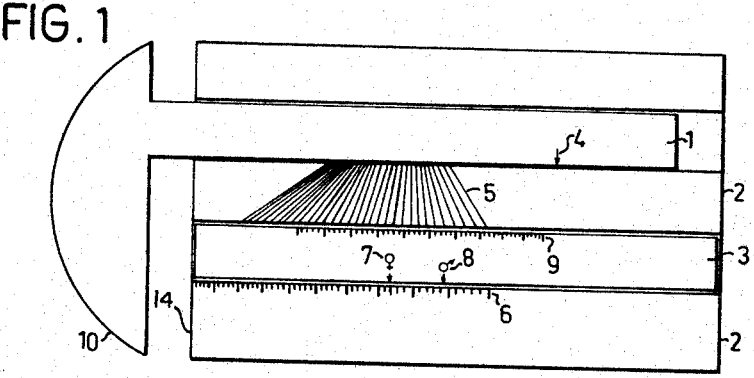

The present invention relates to devices for measuring a dimension and calculating a result dependent on at least one measured value and possibly upon a further factor.

The purpose of the invention is to achieve a device, with which it is possible to perform the dimension measurement simultaneously with the calculation of the result using one and the same instrument while taking into account one or several variables other than the measured value and without the need of tables, formulas or other aids. According to the invention a device is achieved, which is characterized in that it comprises at least two members movable relative each other, of which two are provided with measuring means, that a measurement index on a first one of the members during the measuring operation is arranged to correspond to a certain value on a scale arranged on a second one of the members, with its scale division lines interconnecting a measurement value scale, movable past said index, with a transfer scale with preferably different scale division line spacing, that said first member further is provided with at least one result scale and that on a third member movable with respect to said first member are arranged at least one scale for another measurement or another factor and arranged to be set with respect to the transfer scale, and at least one result index arranged to cooperate with the result scale or scales on the opposite member and to present the desired result or results thereon when the scale for the known value has been set with respect to that value on the transfer scale corresponding to the measured value.

A device according to the invention has a plurality of applications. In order to illustrate the invention, a device according to the invention is described below in the form of an instrument for measuring the radioulnar thickness of a person, i.e. the width over the ends of the two forearm bones measured at the wrist, while simultaneously making available a reading giving the normal body weight of the person with account taken to the height and sex of this person.

Investigations have shown that the radioulnar width can be used for calculating the skeletal weight of a person, if the height of this person is known. From this, it is possible to determine the upper limit for the normal body weight of a person while taking into account not only the height and sex but also the skeletal weight of this person. This determination has previously been performed with the aid of formulas and mathematical calculations or tables. In this way, it was possible to avoid the source of error originating in variations in bone structure, i.e. skeletal weight of different individuals of the same height and sex.

With the aid of a device according to the present invention, it is possible to simultaneously measure the radioulnar width of a person and read off the upper limit for the normal body weight of this person with sex and height taken into account. It is consequently not necessary to use tables, mathematical formulas or other mathematical calculations. The determination of the body weight for a person can therefore be performed within a short time and with good accuracy. The device is characterized by three members movable with respect to each other, of which one member is provided with an index indicating a value of the radioulnar width on a scale on a second member, when the two members are set to sense the radioulnar width of a person. This second member is also provided with a scale indicating an upper limit for the normal body weight of the person. The arrangement is such that the upper limit value is indicated by a sex marking on a third member provided with a height scale when the scale division line of the height scale corresponding to the height of the measured person is set opposite to the measured value of the radioulnar width.

Figure 2:
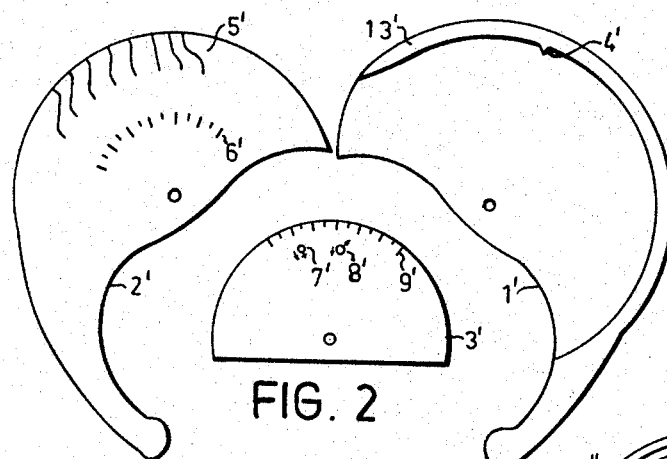
Figure 3:
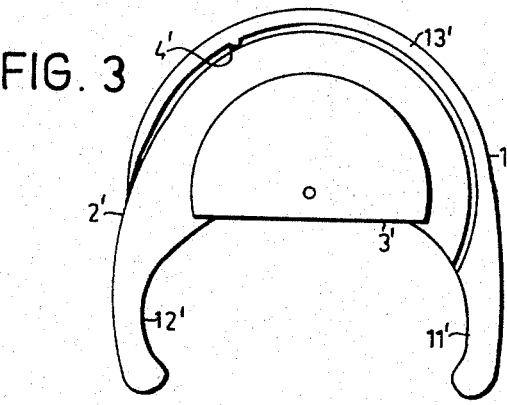
Figure 4:
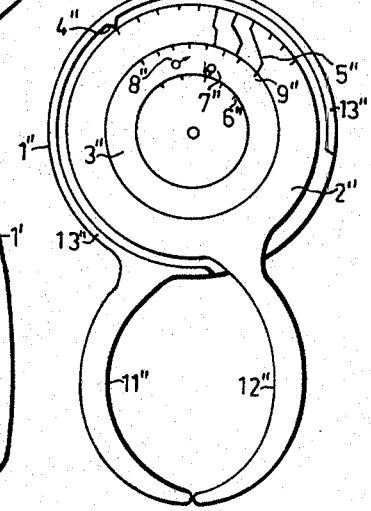

Two advantageous embodiments of the device will be closer described with reference to the accompanying drawings, in which FIG. 1 shows a device in the form of a ruler with movable slides, FIG. 2 shows a device with the members shaped as part-circular discs and FIG. 3 shows a device assembled from these members. FIG. 4 shows a modification of the device shown in FIG. 3 with the discs substantially circular.

The device consists of a member 1 provided with an index 4, a second member 2 with a scale 5 for indicating the radioulnar width and a scale 6 for indicating the upper limit for the normal body weight of a person. The device also comprises a third member 3 which is provided with a height scale 9 and sex markings 7, 8. The device can be made with the second member shaped as a flat stick or elongated plate provided with dovetail grooves, in which said first and third members are inserted. The first member is in this case provided with a part 10 set at right angles to its body and arranged in such a way as to make it possible to measure the radioulnar width of a wrist inserted in the space between this angular part 10 and the adjacent or facing edge 14 of the second member 2.

The device can also be made circular or part-circular, whereby the undermost member 1' in FIGURE 2 or 1'' in FIGURE 4 is provided with an index 4' or 4'' respectively, the intermediate member 2' in FIGURE 2 or 2'' in FIGURE 4 is provided with corresponding scales 5' or 5'' and 6' or 6'' and the upper member 3' in FIGURE 2 or 3'' in FIGURE 4, which is transparent is provided, with the sex markings 7' or 7'' and 8' or 8'' and height scale 9' or 9''. The members 1' and 2' or 1'' and 2'' are in this case provided with legs 11', 12' and 11'', 12'' respectively. All three members are rotatably arranged on a common axis, e.g. a rivet or a bolt. Along part of its periphery the first member is provided with an upstanding rim 13' or 13'' inside of which the second member is rotatable between two abutments, which are formed by the ends of said rim.

The device is used in the following manner. The radioulnar width is determined by inserting the wrist between the angular part 10 and the adjacent or facing edge 14 of the second member or between the tips of the legs 11', 12' or 11'', 12'', respectively. Opposite to index 4, 4' or 4'' it is then possible to read off the radioulnar width on corresponding scale 5, 5' or 5''. The scale division line on the height scale 9, 9' or 9'' corresponding to the height of the measured person is now set against the other edge of corresponding scale 5, 5' or 5''. On scale 6, 6' or 6'' it is now possible to read off the normal body weight of the person opposite to the appropriate sex marking.

Within the scope of the claims, a device of this kind may also be used for other determinations, where measurement of a dimension and mathematical calculations form the basis of the determination.

What I claim is:

1. A device for measuring a dimension and calculating a result dependent on the measurement value obtained and on a known variable factor, characterized in that it comprises three juxtaposed members movable relative to each other, of which first and second members are each provided with a contact the distance between which corresponds to the measured dimension; a fixed index on said first member, a first scale on said second member; said first scale having division lines arranged so that their ends nearer said first member will each register with said fixed index and extend in a predetermined manner to form, with their opposite ends, a transfer scale; said second member further is provided with a result scale and said third member is provided with a third scale with scale division lines indicating values of said known variable factor and arranged to be set with the desired value of the variable factor in registration with the scale division line of said transfer scale corresponding to that scale division line of said first scale registering with said fixed index, a result index being provided on said third member and arranged to cooperate with said result scale on said second member to indicate the sought result thereon.

2. A device as claimed in claim 1 characterized in that said third member is provided with two result indexes.

3. A device as claimed in claim 1, characterized in that said first scale is graduated in values of radioulnar width, said fixed index indicating the appropriate value on said first scale; said third scale for the known variable factor has a body height graduation; said result scale is graduated in weight units, and said third member is provided with two result indexes cooperating with said result scale, the location of the result being determined by known sex-dependent constants, whereby after measuring the radioulnar width and setting the appropriate known body height value on said third scale against the measured radioulnar width value on said transfer scale, the normal body weight can be read off the result scale at the appropriate index.

4. A device as claimed in claim 1, characterized in that said first and second members, comprise, respectively, first and second substantially semicircular disks, provided with measuring legs constituting said contacts, in that the disks are concentrically journalled and rotatable relative to each other, in that said third member carrying said result index comprises a transparent disk, said transparent disk being substantially semicircular and concentrically journalled with respect to said first and second disks and arranged on top of said second disk, which in turn is arranged on top of said first disk, and in that said first disk has a rim portion extending outside the second disk and carrying the fixed index.

5. A device as claimed in claim 1, characterized in that said first member and said third member are shaped as slides arranged to run in grooves provided in said second member, and in that said first slide at one end thereof is provided with a portion making an angle therewith, which portion constitutes one of said contacts and is arranged to cooperate with the facing edge of said second member which edge constitutes the other contact.

References Cited

UNITED STATES PATENTS

| | | | |
|---|---|---|---|
| 728,790 | 5/1903 | West | 33—143 X |
| 3,045,353 | 7/1962 | Barbosa | 33—149 |
| 3,060,585 | 10/1962 | Kirk | 33—143 |
| 3,176,401 | 4/1965 | Constantino | 33—143 X |

LEONARD FORMAN, *Primary Examiner.*